United States Patent [19]
Johnson et al.

[11] 4,088,431
[45] May 9, 1978

[54] MELT SPINNING FILTER

[75] Inventors: Archibald Horace Johnson; Ian Peter Sanderson, both of Harrogate, England

[73] Assignee: Imperial Chemical Industries Limited, London, England

[21] Appl. No.: 572,924

[22] Filed: Apr. 29, 1975

[30] Foreign Application Priority Data

May 7, 1974 United Kingdom .............. 20009/74
May 7, 1974 United Kingdom .............. 20010/74

[51] Int. Cl.² .................. B01D 39/00; D01D 3/00
[52] U.S. Cl. ................. 425/198; 210/489; 210/496; 264/176 F
[58] Field of Search ............. 210/496, 489, 510, 125, 210/111, 446, 509, 503, 506; 425/198, 199; 106/65; 264/42

[56] References Cited

U.S. PATENT DOCUMENTS

| 3,570,059 | 3/1971 | Mott | 425/198 |
| 3,630,384 | 12/1971 | Toda | 210/506 |
| 3,634,576 | 1/1972 | Stuchlik | 425/199 |
| 3,728,061 | 4/1973 | Mott | 425/198 |
| 3,899,342 | 8/1975 | Birchall et al. | 106/65 |
| 3,933,652 | 1/1976 | Weichselbaum et al. | 264/125 |
| 3,947,363 | 3/1976 | Pryor et al. | 210/510 |
| 3,950,177 | 4/1976 | Bruchall et al. | 106/65 |

FOREIGN PATENT DOCUMENTS 43-13,335 6/1968 Japan .................. 425/198

Primary Examiner—Jay H. Woo
Attorney, Agent, or Firm—Cushman, Darby & Cushman

[57] ABSTRACT

A melt spinning process utilizes a spinning pack which contains a filter comprising a shaped, rigid, porous structure comprising inert granular material, e.g. sand or alumina particles, bonded with a permanent binding agent, e.g. sodium silicate or a complex phosphate of aluminium. Synthetic thermoplastic polymers are melt spun, particularly polyesters.

4 Claims, 1 Drawing Figure

U.S. Patent
May 9, 1978
4,088,431
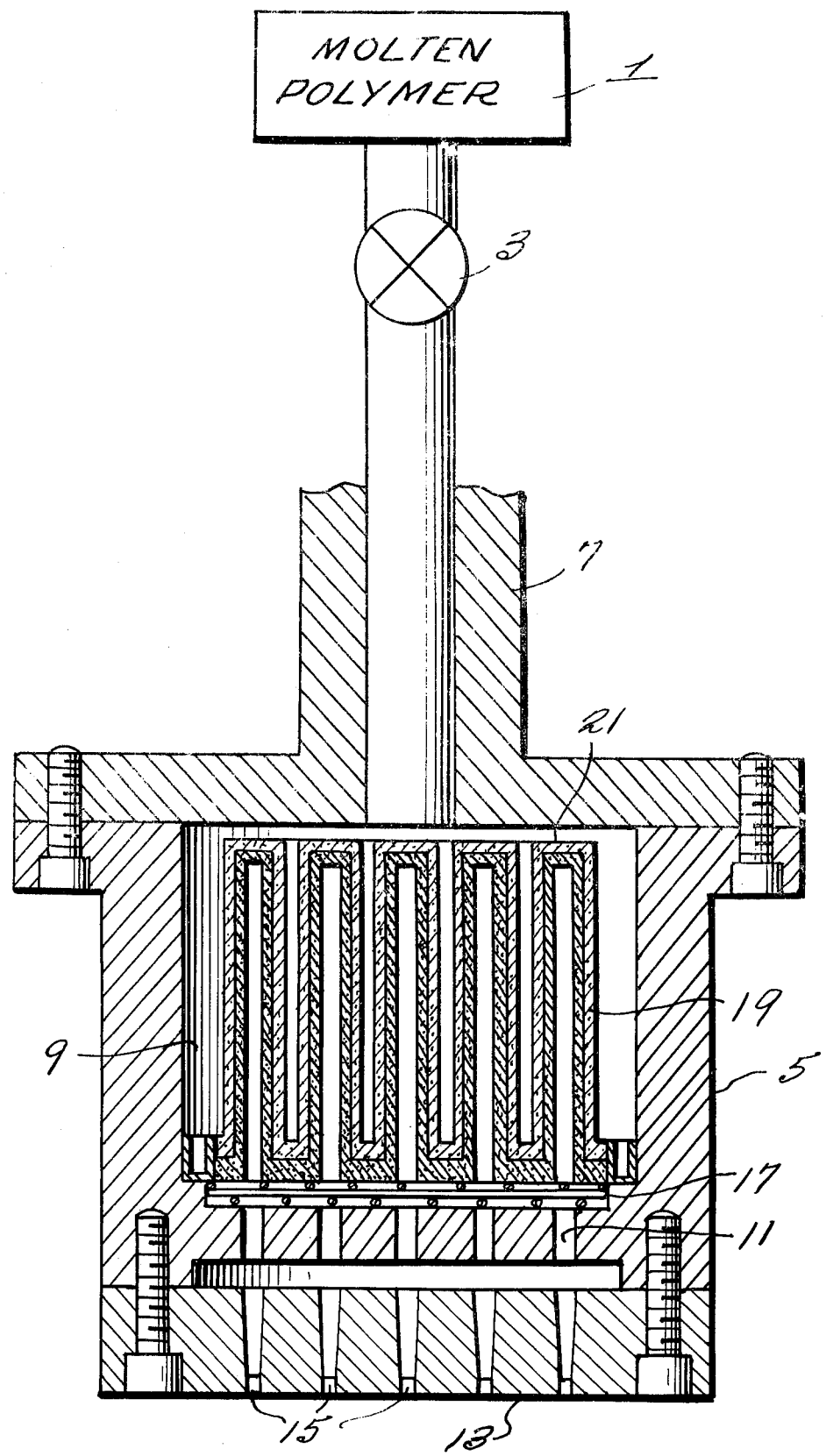

MELT SPINNING FILTER

The present invention relates to a melt spinning process.

In the most common melt spinning system, a molten, highly viscous polymer of fibre-forming material is supplied, under pressure, to a spinning pack via a metering pump and extruded in a filamentary form, through spinning holes of a spinneret located at a downstream termination of the spinning pack. The spinning pack is internally provided with a filter composed of fine particles, for example, fine graded sand, for the removal of impurities and extraneous insoluble and non-meltable materials. Various drawbacks have been identified with the use of a filter of loose, free-flowing, inert granular material in the melt spinning of fibres, during the period from the late 1950's to the early 1970's, and have been described, for example, in UK Patent Specifications Nos. 834 051 and 1 313 333.

In each case the resultant alleged invention was, respectively, to contain the inert granular material of the filter by means of a temporary binding agent or by means of a temporary plastics shell, prior to the commencement of the melt spinning process. The temporary binding agent or the temporary plastics shell was required to be removed prior to or during the passage of the molten polymer. Such modes of operation, whilst having attendant advantages, can lead to undesirable deposits on the spinneret face thereby leading to spinning problems, and to polymer wastage, due to contamination of the polymer by the temporary binding agent or the material of the temporary plastics shell.

According to the present invention, there is provided a process of melt spinning a synthetic thermoplastic polymer wherein a spinning pack is used which contains a filter comprising a shaped, rigid, porous structure comprising inert granular material bonded with a permanent binding agent (as hereinafter defined).

By the expression "a permanent binding agent" is meant a binding agent which remains present within the filter for the duration of its filtering life; also, the amount of binding agent which may be removed, if any, is insufficient to cause wastage of the synthetic thermoplastic polymer due to contamination.

The filter used in the process of the invention may be supported within the spinning pack upon a conventional stainless steel mesh filter and sealed by means of a readily deformable gasket and/or with small quantities of loose, fine-grade, inert granular material. The preferred gasket is made of PTFE.

The filter may comprise one type or different types of inert granular material, and may have uniform particle size or differing particle sizes. If desired, the filter can have a filtering differential, that is the porosity of the filter decreases in the direction of flow of the polymer being filtered. Conveniently, this differential may be achieved by altering the particle size of the inert granular material either step-wise, i.e. by having discrete layers of differing particle size, or continuously.

The filter may be produced in any desired shape by moulding. It may be formed, for example, in the shape of a disc. A desirable shape of filter, which has the advantage that a considerable increase in the surface area of the filter is achieved without a significant increase in the overall dimensions of the filter, is one in the shape of a disc one or other or both of the planar surfaces of which have an annular groove or grooves. The disc may be made of substantially constant thickness by arranging for the annular grooves to be complementary, that is by arranging for a groove in one surface of the disc to correspond to a raised annular portion (defined by two annular grooves) in the other surface of the disc, and vice-versa.

Silica sand is a very satisfactory inert granular material for use in a filter for use according to the invention. Also, other types of sand may be used. Alumina particles may be used. Finely divided inert metallic substances, eg. stainless steel filings, are also suitable. The main criteria in selecting a particular granular material is that the latter is not chemically and/or physically affected by the material to be filtered, nor by the physical conditions imposed upon it during the filtering process i.e. increased temperature and pressure.

Similar considerations apply to the choice of the permanent binding agent. Binding agents which suitably meet such considerations include, for example, sodium silicate (cured with carbon dioxide gassing), ethyl silicate, and silica sol (both cured by ammonia gassing), all of which are especially suited to binding together inert particles of sand. Other suitable binding agents include complex phosphates of aluminium containing at least one chemically-bound hydroxy compound ROH, where R is hydrogen or an organic group, and at least one anion of a strong inorganic acid (other than an oxyphosphorus acid) or of a carboxylic acid.

For inert granular material of given particle size, the amount of binding agent used is sufficient to hold the inert granular material together under its conditions of use and to retain adequate porosity for the filtering function. The amount of binding agent required for a particular inert granular material may be arrived at by simple trial and error. The primary object is to coat thinly each particle of the granular material with the binding agent.

For silica sand filters the preferred binding agent is sodium silicate. The amount of sodium silicate binding agent required may vary between 3% to 5%. An aqueous solution of sodium silicate and the sand are thoroughly mixed together and the mixture 'set' by passing carbon dioxide therethrough. A low rate of gassing is preferred, for example, 1.0% to 2.0% carbon dioxide based on the weight of sand used. Vacuum techniques, wherein the mixture is evacuated prior to gassing, may be used to advantage if desired. Gassing may be effected over a period of a few seconds to many hours using pressures of 5 to 30 lb/sq in. for example. Subsequently, the moulded mixture is 'fired' in an oven at a temperature of 800° to 900° C.

For alumina filters the preferred binding agent is a complex aluminium phosphate.

In the complex aluminium phosphate binder used in production of the filter the anion of a strong inorganic acid (other than oxyphosphorus acid) or of a carboxylic acid, hereinafter referred to as the anionic group, may be an anion of a strong inorganic acid, for example, a halide, nitrate, sulphate or perchlorate, or it may be an anion of a carboxylic acid, for example an acetate or benzoate. Examples of complex phosphates of aluminium containing halogen are described in our British patent specifications Nos. 1 322 722 and 1 322 714. Complex phosphates containing anionic groups other than halide are analogous to the halogen-containing complexes and complex phosphates containing anionic groups other than halide are described in our British Patent Specifications Nos. 1 385 327, which describes complexes containing chemically-bound water, and 1 379 562, which describes complexes containing chemically-bound organic hydroxy compound. The preferred anionic group is halide, most preferably chloride, although complexes containing other halogens, e.g. bromine or iodine, may be used.

Where R in the complex phosphate is hydrogen then ROH is water. Water is the preferred hydroxy compound. Where R in the complex phosphate is an organic group, it is preferred that it be an aliphatic hydrocarbon group or a substituted aliphatic hydrocarbon group. We have found that aliphatic alcohols containing one to ten carbon atoms are especially suitable, and where ROH is an organic hydroxy compound, it is preferred that the hydroxy compound be an aliphatic alcohol containing from one to four carbon atoms, for example methyl alcohol, ethyl alcohol, n-propyl alcohol or isopropyl alcohol, owing to the ready availability of such alcohols.

The ratio of the number of gram atoms of aluminium to the number of gram atoms of phosphorus in the complex phosphate of aluminium may vary over a wide range, for example from 1:3 to 2:1. More suitably the ratio is in the range 0.8:1 to 1.3:1, and is preferably substantially 1:1, that is in the range 0.9:1 to 1.1:1.

The anionic groups are suitably present in the complex phosphate in an amount which renders the complex phosphate soluble in the dispersant present in the mouldable composition used in production of the filters. To this end a suitable ratio of the number of gram atoms of aluminium to the number of gram atoms of anionic groups in the complex phosphate is in the range 0.7:1 to 1.5:1. Preferably, the ratio is substantially 1:1.

The complex phosphates used in this invention may be monomeric or polymeric. The preferred complex phosphates are orthophosphates and within the term phosphate we include phosphate esters.

The complex phosphate may contain, for example, from one to five molecules of the hydroxy compound per phosphorus atom, especially on average approximately four molecules of hydroxy compounds. In some cases the complex phosphate may contain molecules of different hydroxy compounds, for example, it may contain both chemically-bound water and chemically-bound organic compound the total number of such molecules being, for example, from one to five.

Examples of complex phosphates which may be used in the compositions of the invention are complex phosphates containing ethyl alcohol and having the empirical formulae $AlPClH_{25}C_8O_8$ and $AlPBrH_{25}C_8O_8$. The infra-red and X-ray characteristics of these compounds are described in Examples 1 and 3 respectively of the aforesaid UK patent specification No. 1 322 722.

An example of a complex phosphate containing chemically-bound water is that having the empirical formula $AlPClH_{11}O_9$. The infra-red and X-ray characteristics of this complex are described in Example 1 of the aforesaid UK patent specification No. 1 322 724.

The complex aluminium phosphate may be prepared by reacting aluminium or an aluminium compound which preferably contains the desired anionic group, e.g. a halide, with a hydroxy compound R—OH and with phosphoric acid or with a compound capable of yielding phosphoric acid, and separating the resultant complex from the reaction mixture.

Where aluminium or an aluminium compound other than a compound containing the desired anionic group is used then the presence of the acid of the anionic group is necessary during the reaction. Thus, if a halogen-containing complex is desired and aluminium is used in the preparation then the presence of halogen acid is necessary.

The complex phosphate in which R—OH is water can be made as above or by treating with water the complex phosphate in which R—OH is an organic hydroxy compound or, for example, by treating aluminium phosphate hydrate with gaseous hydrogen chloride or with hydrochloric acid.

A dispersant is used in the mouldable composition from which the filters are produced and is desirably a solvent for the binder and, especially in the case where the complex phosphate contains chemically-bound water, is suitably water. In the case where the complex phosphate contains chemically-bound organic hydroxy compound ROH the dispersant is desirably an organic liquid, e.g. an alcohol.

In general, the proportion of binder used in the mouldable composition will be in the range 1% to 25% by weight of the particulate material in the composition, preferably 3% to 15% by weight, and more preferably 5% to 15% by weight. The amount of dispersant used in the composition should be such as to result in a composition having a consistency suitable for moulding and in general 2% to 20% of dispersant by weight of the particulate material will be used, preferably 4% to 15% by weight. The mouldable composition may also contain a clay of the type conventionally used in the refractory art and, in order to speed up the setting of the composition, the composition may contain a setting agent. Suitable setting agents are calcium silicate, for example monocalcium silicate, and especially magnesium oxide. The use of magnesium oxide setting agent in a composition containing a complex phosphate of aluminium of the type described herein is described in our British Patent Specification No. 1 386 518. Setting agents, where used, will generally be present in the composition in a proportion of 2% to 20% by weight of the binder in the composition.

In the production of the filters the components of the composition are thoroughly mixed, suitably by first dry-mixing the solid components in the absence of the liquid dispersant and then adding the dispersant in an amount such as to produce a composition having the desired consistency for moulding. The composition is then charged to a suitably shaped mould and pressed into shape. The composition in the mould is caused or allowed to develop sufficient green strength for the shaped filter to be removed from the mould. Adequate green strength may develop merely on standing, especially if the composition contains a setting agent for the binder. Alternatively, or in addition, the composition in the mould may be heated, e.g. at a temperature of 50° to 200° C, until adequate green strength has been developed for the filter to be removed from the mould. It is especially convenient to use a magnesium oxide setting agent and by suitable choice of the amount of magnesium oxide in the mouldable composition, and in particular by choosing the particle size of the magnesium oxide, a mouldable composition may be obtained which, on addition of the liquid dispersant, is rapidly cold-setting. Indeed, it is possible to produce a mouldable composition which may develop adequate green strength for the shaped structure to be removed from the mould shortly after the composition has been pressed to shape in the mould.

Thereafter the filter may be heated in order to convert the binder into an aluminium phosphate. Firing of the filter may suitably be effected at a temperature up to 1300° C or higher, in general for a period of at least 1 hour, e.g. 2 to 4 hours. The resultant rigid porous filter may then be allowed to cool.

The melt spinning process of the present invention is particularly suited for use in the melt-spinning of polyesters, e.g. poly(ethylene terephthalate), and copolymers thereof. It is also applicable to the spinning of multicomponent filaments, the so-called conjugate filaments, as well as to the spinning of homofilaments.

DESCRIPTION OF THE DRAWING

The drawing illustrates a melt spinning assembly for the spinning of synthetic thermoplastic polymer.

As shown, a supply of molten polymer 1, is forced under pressure via a metering pump 3 to a spinning pack 5 through a feed pipe 7. The feed pipe 7 communicates with the central cavity 9 and passages 11. An extrusion disk 13 containing orifices 15 is provided through which fibers are extruded. A screen 17 may be positioned with filter elements 19 which are closed at their free ends 21.

The invention is illustrated by the following Examples in which all parts are expressed as parts by weight.

EXAMPLE 1

A solid complex aluminium phosphate binder having the empirical formula $AlPClH_{11}O_9$ was prepared by slowly adding 15.2 parts of anhydrous aluminium chloride to 40 parts of distilled water. The resultant solution was cooled to ambient temperature and 7.4 parts of an 88% by weight solution orthophosphoric acid in water was added to it with stirring. The solution was then concentrated to about 20 parts. The resultant solution was allowed to stand and the crystals which were eventually produced were filtered off, washed with ethanol, and dried in a vacuum dessicator. Analysis showed that the crystals corresponded to an empirical formula of $AlPClH_{11}O_9$.

A composition comprising 86 parts of 30 grade (US Standard B74.18-1968) alumina (as supplied by Universal Abrasives Limited, Stafford, England), 4 parts of high alumina ball clay, 0.8 parts of magnesium oxide (Magnorite 100F, Norton Abrasives Limited), and 10 parts of the complex aluminium phosphate binder having the empirical formula $AlPClH_{11}O_9$ was thoroughly mixed in the dry state. 5 parts of water were then added slowly with thorough mixing.

The resultant composition was charged to a mould 6 inches in diameter and 1½ inches deep and profiled so as to produce a disc shaped moulding having annular grooves in the upper and lower surfaces of the moulding. The contents of the mould were subjected to a pressure of 10 tons and the mould was heated for 10 minutes at a temperature of 50° C.

The resultant moulding was removed from the mould and heated at 110° C for 2 hours. It was then heated up to 1200° C over a period of 4 hours, maintained at this temperature for 2 hours, and cooled down over a period of 12 hours. The resultant strong, rigid filter was suitable for use in the filtration of molten polymers, especially in the filtration of molten poly(ethylene terephthalate) as part of a fibre spinning process.

EXAMPLE 2

176 parts of aluminium phosphate trihydrate were slowly dissolved in a mixture of 20 parts of concentrated hydrochloric acid and 200 parts of water. The resultant pale yellow solution was spray-dried in a co-current spray drier having a spinning disc atomiser and a chamber at atmospheric pressure. The air inlet temperature was 190° C and the air outlet temperature was 69° C. A white water-soluble complex aluminium phosphate powder was produced having an emirical formula corresponding to $AlPClH_9O_8$.

A composition comprising 88.5 parts of 30 grade alumina, 3 parts of high alumina ball clay, 1½ parts of magnesium oxide, and 5 parts of the complex aluminium phosphate prepared as described above was thoroughly mixed in the dry state and 3 parts of water were then added with thorough mixing. The resultant composition was charged to a mould of the type used in Example 1 except that the annular grooves were produced only in the upper surface of the moulding. The surface area of the moulding was 2.5 times that of a mould of similar overall dimensions in which the annular grooves were absent. The contents of the mould were pressed under a 10 ton load, the moulding was removed from the mould and heated at 110° to 150° C for 4 hours and then at a temperature in the range 1200° to 1500° C for 2 hours. The resultant moulded filter was allowed to cool to ambient temperature over a period of 12 hours.

The filter produced as described above was inserted in a standard spinning pack for polyester spinning and 0.67 IV poly(ethylene terephthalate) polymer containing 0.9% (based on the weight of the polyethylene terephthalate) of 50 $\mu$ particle size carbon black contaminant was spun at a temperature of about 280° C and at a rate of throughput of polymer of 60lb/hr. The carbon black contaminant was added in order to accelerate the rate of pressure rise in the spinning pack, the rate of pressure rise being a measure of the rate at which the pores of the filter became blocked with contaminant. The mean rate of pressure rise was 108 pounds/sq in.-/minute.

By way of comparison the spinning procedure described above was repeated except that the filter in the spinning pack was a standard non-bonded sand pack filter made up of 18/36 British Standard mesh sand. In this case the mean rate of pressure rise was 230 pounds/sq in/minute.

EXAMPLE 3

A number of filters were produced following the procedure described in Example 2 except that 86 parts of 46 grade alumina and 7.5 parts of the complex aluminium phosphate were used and the surface of the moulding was profiled to give a surface area 1.7 times that of a moulding of similar overall dimensions but in which the annular grooves were absent.

The spinning procedure of Example 2 was followed and occurrence of the first extrusion fault was noted on average after 5000lb of polymer had been spun.

By way of comparison where a standard non-bonded sand pack filter was used occurrence of the first extrusion fault was noted on average after 2500lb of polymer had been spun.

In this Example the particle size of the alumina used in the production of the filter and the particle size of the sand in the standard non-bonded sand pack were chosen such that in each case the pack start-up pressure in the spinning process was similar.

EXAMPLE 4

An aqueous solution of sodium silicate was thoroughly mixed with 18/36 British Standard mesh silica sand. The mixture was pressed in a mould and the surface of the moulding was profiled to give a surface area 1.7 times greater as described in Example 3. The moulded filter was left to air harden, and was then gassed with carbon dioxide gas for a period of 12 hours. The amount of sodium silicate binder present was 5%.

After removal from the mould, the filter was heated up to between 800° C over 24 hours, maintained at this temperature for a further 24 hours, and then allowed to cool.

Fifty such filters where then compared with fifty standard non-bonded (18/36 B.S. mesh) sand filters on a production run, spinning 60lb/hour of 0.67 I.V. poly-(ethylene terephthalate) polymer per spinning pack at temperature of 280° C.

The mean pack life for the standard filters, expressed in pounds of polymer spun per pack, was 3000 lbs. In comparison, the mean pack life for the bonded filters used according to the invention was 4500 lbs.

What we claim is:

1. A melt spinning assembly for the spinning of synthetic thermoplastic polymer comprising a spinning pack, filter within the spinning pack means for supplying molten polymer to the spinning pack and means for extruding the molten polymer therefrom; wherein the filter comprises a shaped, rigid porous structure comprising inert granular material bonded with a permanent binding agent which remains present within the filter for the duration of its filtering life, said permanent binding agent being selected from the group consisting of sodium silicate cured with carbon dioxide gassing, ethyl silicate cured by ammonia gassing, silica sol cured by ammonia gassing and aluminum phosphate derived from complex phosphates of aluminum containing at least one chemically-bound hydroxy compound ROH, where R is hydrogen or an organic group, together with at least one anion from the group consisting of a carboxylic acid or of a strong inorganic acid other than an oxyphosphorous acid.

2. A melt spinning assembly according to claim 1, wherein the filter is in the shape of a disc, at least one of the planar surfaces of which has at least one annular groove therein.

3. A melt spinning assembly according to claim 1, wherein the filter is formed of alumina particles bonded with an aluminum phosphate derived from a complex phosphate of aluminum containing at least one chemically-bonded hydroxylic compound ROH, where R is hydrogen or an organic group, and at least one anion of a strong inorganic acid (other than an oxyphosphorus acid) or of a carboxylic acid.

4. A process according to claim 1 wherein said permanent binding agent is selected from the group consisting of sodium silicate cured with carbon dioxide gassing, ethyl silicate cured by ammonia gassing, silica sol cured by ammonia gassing and an aluminum phosphate derived from complex phosphates of aluminum containing at least one chemically-bound hydroxy compound ROH, where R is hydrogen or an organic group, together with at least one anion from the group consisting of a carboxylic acid or of a strong inorganic acid other than an oxyphosphorus acid.

* * * * *